United States Patent

[11] 3,590,984

| [72] | Inventor | Gunther Nolte<br>Mannheim-Kafertal, Germany |
|---|---|---|
| [21] | Appl. No. | 822,236 |
| [22] | Filed | May 6, 1969 |
| [45] | Patented | July 6, 1971 |
| [73] | Assignee | Conard Scholtz AG<br>Hamburg, Germany |
| [32] | Priority | May 15, 1968 |
| [33] | | Austria |
| [31] | | A4661-68 |

[54] BELT CONVEYOR DEVICE WITH A BELT GUIDING ASSEMBLY COOPERATING WITH THE OUTSIDE OF THE CONVEYOR BELT
9 Claims, 6 Drawing Figs.

[52] U.S. Cl. .................................................. 198/202
[51] Int. Cl. ............................................... B65g 15/62
[50] Field of Search .......................................... 198/16, 17, 18, 165, 201, 202; 74/240, 241

[56] References Cited
UNITED STATES PATENTS

| 2,563,184 | 8/1951 | Naylor .................. | 198/165 |
| 3,319,776 | 5/1967 | Bechtloff et al. ............ | 198/165 |

*Primary Examiner*—Evon C. Blunk
*Assistant Examiner*—Alfred N. Goodman
*Attorney*—Hill, Sherman, Meroni, Gross and Simpson ABSTRACT: A belt conveyor device including a conveyor belt, which has a raised strip along each edge on one surface for laterally confining material being transported on the belt, moving along a path having straight portions interconnected by a curved portion and a belt guiding assembly for guiding the conveyor belt through the curved portion of the path. The belt guiding assembly includes a pair of end rollers and intermediate rollers which are rotatably journaled in a housing and extend across the width of the conveyor belt. A cover belt is supported on the rollers to travel in an arcuate path while contacting the edge strips of the conveyor belt moving through the curved portion of the path. The housing is mounted to be rotatable on a pivot axis so that the belt guiding assembly promptly corrects any deviation in the path of the conveyor belt.

PATENTED JUL 6 1971

INVENTOR.
Günther Nolte

BY
ATTYS.

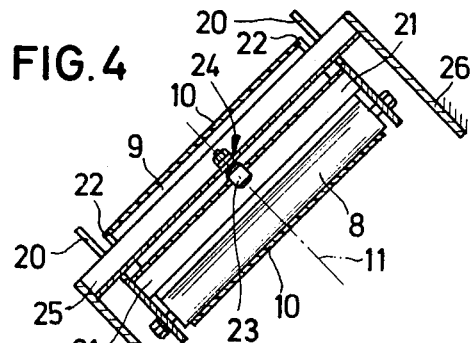
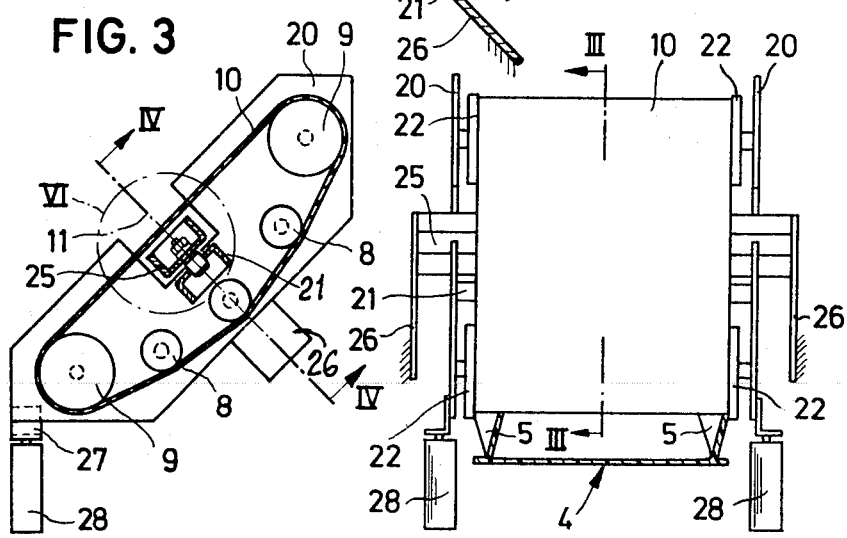
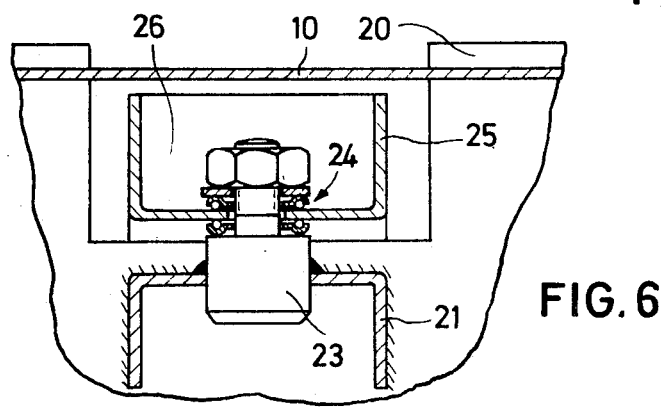

BELT CONVEYOR DEVICE WITH A BELT GUIDING ASSEMBLY COOPERATING WITH THE OUTSIDE OF THE CONVEYOR BELT

BACKGROUND OF THE INVENTION

1. Field of the Invention

This invention pertains to a belt conveyor device and particularly a conveyor device having a belt path which changes plane.

2. Description of the Prior Art

It is desirable to have a belt conveyor system which utilizes a belt having raised portions such as corrugated strips along its edge to laterally retain material on the belt; however, problems in guiding the belt occurred if the plane or path of the belt while carrying material should be changed.

It has been previously proposed to provide a belt conveyor of the type referred to with an assembly of stub rollers or disc wheels engaging the outer edges of the conveyor belt outside the corrugated strips. In such an arrangement the corrugated strips are liable to come into contact with rotating or stationary parts as the conveyor belt moves sideways, and are therefore subject to considerable wear. With relatively large conveyor devices the conveyor belt may sag in the middle due to its weight, its width and its loading, and may jump out or become disengaged from the belt guiding arrangement.

Guiding devices which pivot about a point have been proposed for guiding a conveyor belt while traveling on a straight portion of a conveyor path. However, due to the structure of these prior art guiding devices, they cannot be used to guide a conveyor belt while moving in a curved portion of the belt path.

SUMMARY OF THE INVENTION

The present invention is a belt conveyor device having a belt guiding assembly for guiding a conveyor belt having material retaining raised edge portions through a curved portion of the path of travel. The belt guiding assembly includes an endless cover belt that contacts or engages both raised edge portions while the conveyor belt passes through the curved portions of the path. The cover belt passes around and is supported on a number of parallel rollers which extend the full width of the conveyor belt and which are rotatably journaled in a support housing. In the preferred embodiment, the support housing is mounted to pivot about a fixed axis so that the belt guiding assembly corrects any deviation of the travel of the belt conveyor from the desired path to insure reliable straight running of the conveyor belt.

The belt guiding assembly of the present invention reduces the wear on the conveyor belt because the only contact between the guiding assembly and the conveyor belt is limited to the contact between the cover belt and the raised edge portion of the conveyor belt. Since the cover belt extends across the width of the conveyor belt, the guiding assembly remains in contact with the raised edges of the conveyor belt regardless of any change in the distance therebetween due to sagging of the conveyor belt and thus the problem of the prior art conveyor belt becoming disengaged from the guiding device is eliminated. Since the guiding assembly engages only the raised edge portions, the lateral edges outside of the raised edge portions of the conveyor belt are unnecessary and the guiding assembly enables the use of a narrower conveyor belt to transport the same amount of material than the belts used with the prior art guiding assemblies.

Accordingly, an object of the present invention is a belt conveyor device including belt guide means for guiding the conveyor belt through a concave path of travel.

Another object of the present invention is a belt conveyor device including belt guide means which insure reliable straight running of the conveyor belt with a reduction in the belt wear.

A still further object of the present invention is a belt conveyor device having a belt guide means which avoids excessive friction between the means and the conveyor belt.

Other objects, features and advantages of the invention will be readily apparent from the following description of a preferred embodiment thereof, taken in conjunction with the accompanying drawings although variations and modifications may be effected without departing from the spirit and scope of the novel concepts of the disclosure.

BRIEF DESCRIPTION OF THE DRAWINGS

FIG. 3 is a longitudinal cross section through a complete belt guiding assembly illustrated in FIGS. 1 and 2, taken along the line III-III of FIG. 5;

FIG. 4 is a cross section with parts in elevation through the belt guiding assembly taken along line IV-IV of FIG. 3;

FIG. 5 is an end view of the belt guiding assembly according to FIG. 3, and

FIG. 6 is an enlarged cross-sectional view with parts in elevation of that portion of the belt guiding assembly illustrated in FIG. 3 contained in the circle designated by VI.

DESCRIPTION OF THE PREFERRED EMBODIMENT

Figure 1:
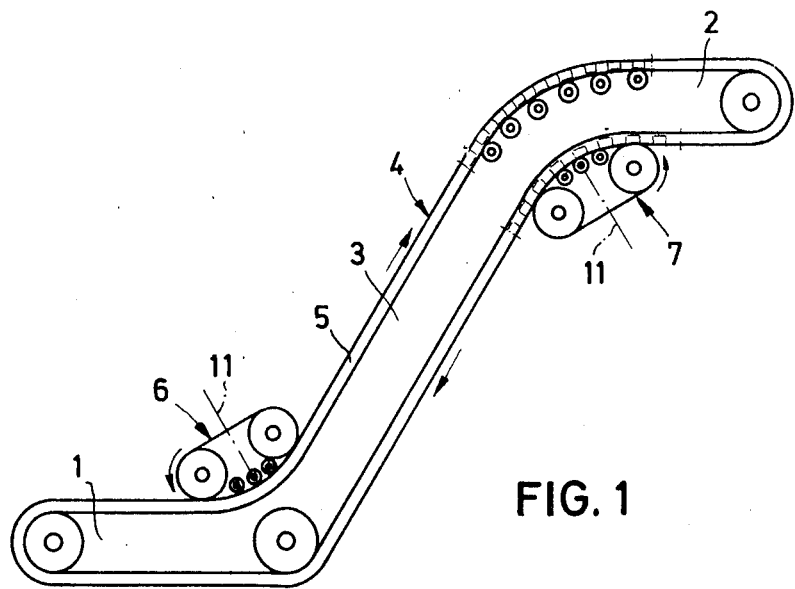
FIG. 1 is a side view with portions removed for purposes of illustration of a belt conveyor device having two belt guiding assemblies according to the invention.

A so-called S or Z belt conveyor device according to FIG. 1 has a path with horizontal receiving and delivery portions 1 and 2 and, between them, a steep conveying portion 3 which is interconnected to each of the portions 1 and 2 by a concave portion of the path of a conveyor belt 4. As is usual with such a device, the conveyor belt 4 has along the edges of its outer face or surface corrugated edge strips 5, as well as transverse ridges, not shown. In the concavely curved portions of the path where the top and bottom strands of the belt 4 change their angle of inclination are provided belt guiding assemblies 6 and 7 each comprising intermediate rollers 8 and end rollers 9 rotatably mounted in a common support housing having side members 20 interconnected by a member such as a channel section beam 21 (FIG. 4), and extending transversely across the conveyor belt and parallel with one another. The envelope or surface of support of the rollers 8 and 9 presented towards the conveyor belt conforms to an arc of a circle, and the rollers are encircled by an endless cover belt 10 which is in frictional contact with the corrugated edge strips 5 of the conveyor belt 4, by which belt 10 is driven. To reduce friction between the corrugated strips 5 and the cover belt 10 and to insure a smooth running of the conveyor belt 4, the portion of the arc extends over a larger included angle than the included angle of the concave portion of the path of the change of direction of the conveyor belt 4, so that the latter does not encounter the cover belt 10 until after the front end roller 9 and leaves the cover belt 10 before it reaches the rear end roller 9, thus ensuring smooth vibration free running of the conveyor belt 4. In order to avoid the running properties being adversely effected by the rollers 8, 9, the cover belt 10 is looped around the rollers without tension and is guided by collar means such as collars or adjusting rings 22 provided on the ends of the end rollers 9 and/or of the intermediate rollers 8.

The belt guiding assembly 6 is mounted to pivot about a perpendicular pivoting axis 11 lying in the plane bisecting the angle between adjacent portions 1 and 3 of the path of the conveyor belt 4 and in the central plane of the conveyor belt 4. The pivotal axis 11 coincides with the axis of a pivot pin 23 which, as shown in FIGS. 3, 4 and 6, is welded centrally in the belt guiding assembly 6 to the channel section beam 21, and pivotally connects it through a thrust bearing 24 to a support or part 25 in the form of a second beam which passes through opening in the side member 20,20 of the support housing (and through the space enclosed by the cover belt 10) and is welded on both sides to fixed supports 26.

Outside and at the front end of each of the side members 20 which are sheet metal plates, are a pair of angles 27 in which are mounted guide rollers 28 at opposite sides of the conveyor belt 4 with their axes at right angles thereto. The guide rollers 28 serve as additional guides for the conveyor belt 4 at the intake to the belt guiding assembly 6.

Figure 2:
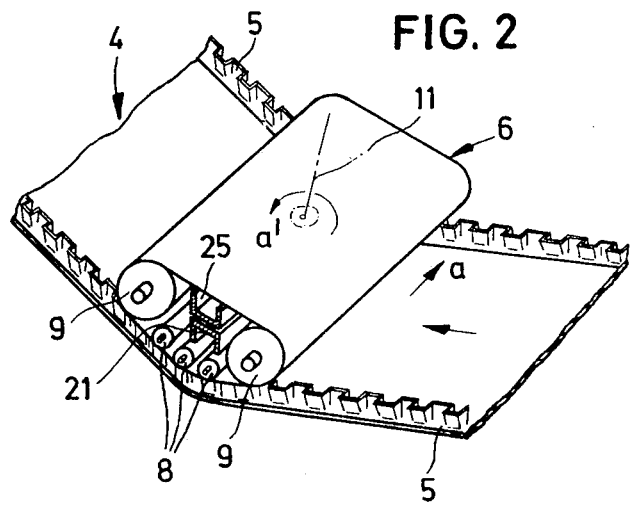
FIG. 2 is a perspective view of a belt guiding assembly according to the invention with portions of the housing removed for purposes of illustration acting on a portion of the conveyor belt.

The belt guiding assembly 6 (FIG. 1) which is associated with the upper strand of the conveyor belt 4 of an S or Z conveyor, operates in the following manner: the conveyor belt 4 which is charged at its horizontal receiving portion 1 runs with its corrugated edge strips 5 past the guide rollers 28 and under the cover belt 10 of the belt guiding assembly 6 and drives the belt 10 in the direction of movement. In the state of equilibrium, the friction forces between each of the corrugated strips 5 and the cover belt 10 act at the same distance from the pivoting axis 11, and are cancelled out. If, however, the conveyor belt 4 runs towards one side, for example in the direction *a* (FIG. 2), then the distance between the corrugated strip 5 and the pivot axis 11 increases in this direction while the distance between the axis 11 and the other corrugated strip 5 decreases. Thus, the friction forces exert a moment force on the belt guiding assembly 6, which moment force turns the assembly 6 about the axis 11 in the direction of the curved arrow *a'* to guide the conveyor belt 4 back to the center of the desired path. Thus any deviation of the conveyor belt 4 from its prescribed path is promptly corrected.

The construction of the belt guiding assembly 6 enables the use of a conveyor belt 4 which does not have lateral marginal portions outside of the corrugated strip 5 and, therefore, the belt guiding assembly 6 enables the use of a narrower conveyor belt for a fixed capacity than the previous known guiding assemblies utilizing stub rollers on disc wheel.

I claim as my invention:

1. In a belt conveyor device including a conveyor belt being moved along a path having a curved portion interconnecting straight portions, the conveyor belt having along the edges of its outer surface raised edge strips to laterally confine material being transported thereon and to guide the conveyor belt through the curved portion of the path, the improvement comprising a belt guiding assembly comprising a support housing, the number of parallel rollers being rotatably mounted in said housing and extending the full width of the conveyor belt, and an endless cover belt passing around said rollers and engaging the raised edge strips of the conveyor belt for guiding the conveyor belt through the concave portion of the path, said support housing being pivotally mounted on a fixed part to pivot about a pivot axis extending at right angles to said conveyor belt.

2. In a belt conveyor device according to claim 1, wherein said pivot axis lies in a plane bisecting the angle defined by the straight portions of the path interconnected by the curved portion.

3. In a belt conveyor device according to claim 1, wherein said fixed part is a beam passing through the space enclosed by said cover belt.

4. In a belt conveyor device according to claim 1, wherein said cover belt loosely fits around said rollers.

5. In a belt conveyor device according to claim 4, which includes collar means disposed on the opposite ends of at least one roller for guiding the travel of said cover belt on said rollers.

6. In a belt conveyor device according to claim 1 wherein said rollers are mounted in said support housing so that the path of the cover belt presented to the conveyor belt is an arc of a circle.

7. In a belt conveyor device according to claim 1, wherein said roller includes a pair of end roller and a plurality of intermediate rollers, all of said rollers being mounted in said support housing with the surfaces of supporting contact of the roller for the cover belt being on an arc of a circle having a greater included angle than the angle of the arc of the curved portion of path of the conveyor belt so that a portion of said cover belt being supported by the end rollers is free of engagement with the edge strip of the conveyor belt.

8. In a belt conveyor device according to claim 1, wherein the pivot axis lies in a plane bisecting the angle defined by the straight portions of the path interconnected by the curved portion.

9. In a belt conveyor device according to claim 8, wherein the pivot axis lies in a central plane of the conveyor belt, and wherein said cover belt loosely fits around said rollers.

UNITED STATES PATENT OFFICE
CERTIFICATE OF CORRECTION

Patent No. 3,590,984      Dated July 6, 1971

Inventor(s)     Gunther Nolte

It is certified that error appears in the above-identified patent and that said Letters Patent are hereby corrected as shown below:

On the title page, line [73]; "Conard Scholtz AG" should read --Conrad Scholtz AG--

Column 3, line 41; "the number" should read --a number--

Signed and sealed this 10th day of April 1973.

(SEAL)
Attest:

EDWARD M. FLETCHER, JR.
Attesting Officer

ROBERT GOTTSCHALK
Commissioner of Patents